H. Smith. Jr,

Man Hole Plate for Tannery Stuffing Wheels

No. 100,939          Patented Mar. 15, 1870.

WITNESS.
J. B. Smith
W. M. Hornor

INVENTOR.
Henry Smith Jr

United States Patent Office.

HENRY SMITH, JR., OF MILWAUKEE, WISCONSIN.

Letters Patent No. 100,939, dated March 15, 1870.

IMPROVED MAN-HOLE PLATE FOR TANNERY STUFFING-WHEEL.

The Schedule referred to in these Letters Patent and making part of the same.

*To all whom it may concern:*

Be it known that I, HENRY SMITH, Jr., of the city and county of Milwaukee, and State of Wisconsin, have invented a new and useful Improvement in Man-Hole Plates for Tannery Stuffing-Wheel; and I do hereby declare that the following is a full, clear, and exact description thereof, which will enable those skilled in the art to make and use the same, reference being had to the accompanying drawings forming part of this specification, in which—

Figure 1:
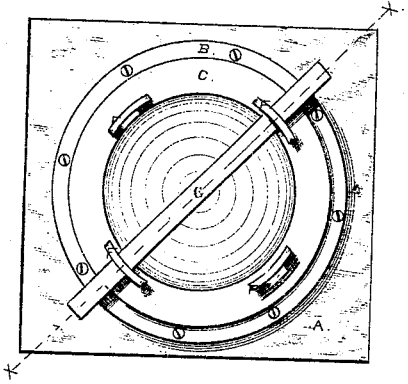
Figure 2:
Figure 3:
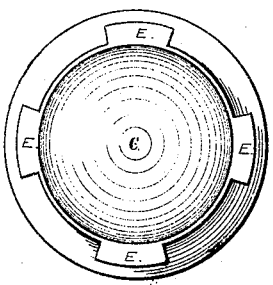

Figure 1 is a front view;

Figure 2, a sectional view in the line X X, fig. 1;

Figure 3, a back-side view of the covering-plates; and

Figure 4:
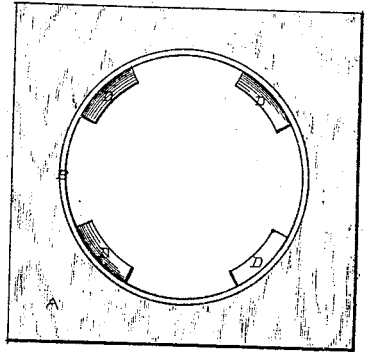

Figure 4, a back-side view of the rim, which is covered by the covering-plate.

Similar letters of reference in each of the figures indicate corresponding parts.

The nature and object of my invention is to provide for shutting up tight the opening into a stuffing-wheel for tannery, and also for fastening up man-holes in boilers and other places where there is pressure of steam or water.

A is the head of the wheel or cylinder or other surface, in which the man-hole plate is inserted.

B, the inner rim attached to the head of the wheel or cylinder.

C, the outer covering-plate.

D, lugs on the inner rim.

E, lugs on the outer rim.

These lugs are made wedging, so that when the outer plate is put on and turned the wedge or screw-shaped lugs will make them hang together.

F, raised projections, with holes through them to put in a lever to turn the cover C.

G, a lever put through the holes in F.

H, packing between the inner rim B and the wood work of the wheel or cylinder.

Operation.

The inner rim B being fastened to any place where it is necessary to keep it tight, the cover C is put on and turned a little, and they will be forced together so tight that nothing can pass through. This rim B and the cover C is finished up so as to fit together close.

Claims.

I claim as my invention—

1. A man-hole plate, with the rim B, covering-plate C, and lugs D and E, substantially as described.

2. A man-hole plate, when constructed with rim B, covering-plate C, with the lugs D and E, raised projections F with holes in them, and packing H, substantially as described.

HENRY SMITH, JR.

Witnesses:
W. M. HORNOR,
J. B. SMITH.